No. 643,391. Patented Feb. 13, 1900.
J. T. ATKIN.
FODDER BINDER.
(Application filed May 22, 1899.)
(No Model.)
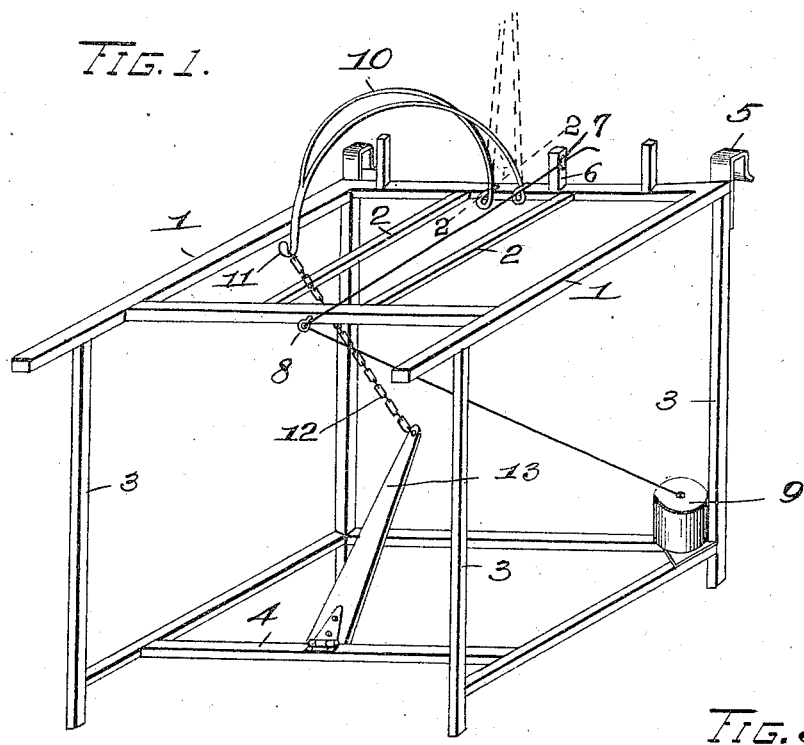
Fig. 1.
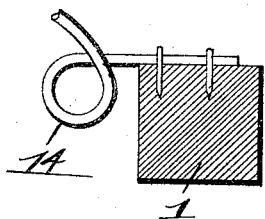
Fig. 2.
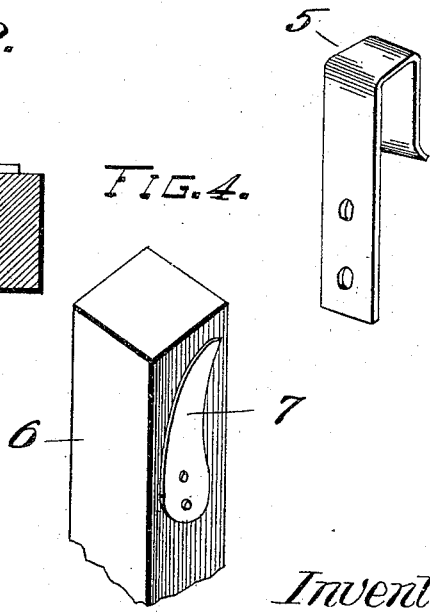
Fig. 3.
Fig. 4.
Attest
C. J. McCauley
M. Smith
Inventor:—
James T. Atkin.
By Higdon & Longan
Attys.
THE NORRIS PETERS CO., PHOTO-LITHO., WASHINGTON, D. C.

UNITED STATES PATENT OFFICE.

JAMES T. ATKIN, OF OLEAN, MISSOURI.

FODDER-BINDER.

SPECIFICATION forming part of Letters Patent No. 643,391, dated February 13, 1900.

Application filed May 22, 1899. Serial No. 717,759. (No model.)

*To all whom it may concern:*

Be it known that I, JAMES T. ATKIN, of the city of Olean, Miller county, State of Missouri, have invented certain new and useful Improvements in Huskers' Benches and Fodder-Binders, of which the following is a full, clear, and exact description, reference being had to the accompanying drawings, forming a part hereof.

My invention relates to an improved husker's bench and fodder-binder; and it consists of the novel construction, combination, and arrangement of parts hereinafter described and claimed.

Figure 1 is a view in perspective of my improved husker's bench and fodder-binder. Fig. 2 is an enlarged cross-sectional view taken approximately on the line 2 2 of Fig. 1. Fig. 3 is a view in perspective of one of the hooks made use of in connection with the device. Fig. 4 is a view in perspective of a spring catch or clamp in which the free end of the binding-twine is engaged.

In the construction of the bench and binder I make use of a rectangular framework 1, between the side portions of which is arranged a pair of longitudinally-extending bars 2, and the frame thus constructed is supported upon suitable legs 3, the same being framed together at their lower ends by the cross-bars 4.

Secured to the upper ends of the rear pair of legs or standards 3 are the hooks 5, the same being engaged over the end-gate of a wagon when it is desired to move my improved bench and binder from one point to another.

Extending upwardly from the rear end of top frame 1 is a block 6, on one side of which is fixed an upwardly and outwardly projecting spring 7. Secured to the front edge of the frame 1 and projecting inwardly therefrom is a screw-eye 8, and arranged upon one of the cross-bars 4 is a receptacle 9, adapted to retain a ball of binding-twine.

10 indicates a double spring, the free end of which is formed into the hook 11, which hook is adapted to be engaged by the upper end of a chain 12, the lower end of which is connected to the rear end of a foot-lever 13, the same being hinged to the front one of the cross-bars 4 in the lower end of the frame of the binder and bench. The lower ends of the doubled wire spring 10 are formed into the loops 14, and said ends are fixed in any suitable manner to the center of the rear portion of the frame 1 between the longitudinally-extending bars 2. This spring 10 normally occupies a vertical position, as shown by dotted lines in Fig. 1, and when said spring is in use it is bent forwardly in the form of an inverted U, and the hook 11 is engaged by the upper end of the chain 12, thus elevating the rear end of the foot-lever 13.

When my improved bench and binder is in use, a ball of binding-twine is located in the receptacle 9, and the free end of said twine is extended upwardly through the screw-eye 8 and from thence rearwardly over the top of the frame 1 to the block 6, and the free end of said twine is clamped behind the spring 7, carried by said block. The stalks of corn or fodder are now placed transversely upon top of the frame 1 and the longitudinally-extending bars 2, and when the proper amount of fodder has been thus positioned the operator swings the hooked end of the double spring 10 forwardly and downwardly over the bundle of fodder, engages the upper end of the chain 12 in said hook, and then places his foot upon the foot-lever 13 and depresses the rear end thereof. This movement necessarily swings the spring 10 downwardly, and the center of the bundle of fodder is pressed or clamped into a small compass, after which the free end of the twine is disengaged from behind the spring 7 and brought around the compressed center of the bundle of fodder, and said twine is tied at a point just in front of the screw-eye 8. This binds the bundle of fodder, and after severing the twine outside the point where the tie is made the operator disengages the upper end of the chain 12 from the hook 11, thus allowing the spring 10 to swing upwardly into its normal position, and the bundle of fodder is now free to be removed from the bench. The free end of the twine is now drawn across the top of the bench, engaged behind the spring 7, and the binder is ready for the next operation. The operation of husking the corn or removing the ears from the stalks is accomplished at the time the stalks of corn are positioned upon the frame 1.

When it is desired to move the bench and binder from one shock to another, the hooks 5 are engaged over the end-gate of the wagon, and then said bench and binder may be moved with the wagon.

By the use of a bench and binder of my improved construction the operator may stand erect while husking and binding, the fodder is prevented from coming in contact with the ground, and the fodder is tied into compact bundles, which are very easily handled.

I claim—

A husker's bench, comprising a rectangular frame 1, of which the cross-pieces 4 at the front of said frame are equal distances from the upright pieces 3, a foot-lever 13 pivotally connected to the lower of the cross-pieces 4 at the front of the frame, a chain 12 attached to the free end of said lever, an eye 8 secured to the front side of the upper of the forward cross-pieces 4, a double spring 10 having loops 14 secured to the rear one of the upper cross-pieces 4, said spring being provided with a hook 11 on its forward end which is adapted to be engaged by the said chain 12, a receptacle 9 secured upon the rear one of the lower cross-pieces 4, and a block 6 to which is attached a spring 7 for the purpose of engaging the free end of the twine when the machine is in use, substantially as specified.

In testimony whereof I affix my signature in presence of two witnesses.

JAMES T. ATKIN.

Witnesses:
  JAS. E. HITE,
  W. E. ALLEN.